(12) United States Patent
Yoon (10) Patent No.: US 12,375,019 B2
(45) Date of Patent: Jul. 29, 2025

(54) MOTOR DRIVER, MOTOR DRIVE SYSTEM, AND METHOD OF DRIVING MOTOR

(71) Applicant: LX SEMICON CO., LTD., Daejeon (KR)

(72) Inventor: Jang Hyun Yoon, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 32 days.

(21) Appl. No.: 18/240,429

(22) Filed: Aug. 31, 2023

(65) Prior Publication Data

US 2024/0072706 A1 Feb. 29, 2024

(30) Foreign Application Priority Data

Aug. 31, 2022 (KR) .................. 10-2022-0109848

(51) Int. Cl.
*H02P 6/18* (2016.01)
*H02P 23/14* (2006.01)
*H02P 27/08* (2006.01)

(52) U.S. Cl.
CPC .............. *H02P 23/14* (2013.01); *H02P 27/08* (2013.01)

(58) Field of Classification Search
CPC .......... H02P 23/14; H02P 27/08; H02P 6/185; H02P 6/182; H02P 6/085; H02P 6/18; H02P 6/20; H02P 6/21; H02P 25/03; H02M 1/088; H02M 7/5387

See application file for complete search history.

(56) References Cited

U.S. PATENT DOCUMENTS

| 2017/0082419 | A1* | 3/2017 | Li | ............................. H02P 6/20 |
| 2019/0319562 | A1 | 10/2019 | Narumi | |
| 2022/0373588 | A1* | 11/2022 | Maki | ..................... H02P 29/024 |

FOREIGN PATENT DOCUMENTS

| EP | 2790316 A2 | 10/2014 |
| EP | 3414449 A2 | 12/2018 |
| GB | 2326778 A | 12/1998 |
| WO | 2017138020 A2 | 8/2017 |

OTHER PUBLICATIONS

Bo Hu et al. "Sensorless Control Technology of Brushless DC Motor for Air-conditioner in FCV," Electric Machines and Drives Conference, 2009. IEMDC '09. IEEE International, IEEE, Piscataway, NJ, USA, (May 3, 2009), pp. 1492-1496, XP031475968.
Extended European Search Report issued on Jan. 25, 2024 for European Application No. 23194187.3, 8 pages.

* cited by examiner

*Primary Examiner* — Muhammad S Islam
(74) *Attorney, Agent, or Firm* — ROTHWELL, FIGG, ERNST & MANBECK, P.C.

(57) ABSTRACT

The present disclosure relates to a motor driver capable of simply estimating an initial position of a rotor, and the motor driver according to one embodiment may include a gate driver for sequentially driving three-phase coils of a motor in first to sixth operation modes through an inverter for driving the three-phase coils and an initial position detector for detecting a maximum peak value among first to sixth currents by sensing the first to sixth currents flowing through two-phase coils among the three-phase coils through the inverter in each of the first to sixth operation modes and determine a starting position of a rotor of the motor based on the detected maximum peak value.

20 Claims, 6 Drawing Sheets

MOTOR DRIVER, MOTOR DRIVE SYSTEM, AND METHOD OF DRIVING MOTOR

CROSS-REFERENCE TO RELATED APPLICATIONS

This application claims the benefit of the Korean Patent Application No. 10-2022-0109848 filed on Aug. 31, 2022, which is hereby incorporated by reference as if fully set forth herein.

BACKGROUND

Field of the Invention

The present disclosure relates to a motor driver, a motor drive system, and a method of driving a motor, which may simply estimate an initial position of a rotor.

Discussion of the Related Art

Recently, various electronic devices including vehicles or home appliances, such as washing machines and refrigerators, use a brushless direct current (hereinafter, referred to as a "BLDC") motor with high energy efficiency because the BLDC motor does not use a brush for commutation.

The BLDC motor may perform electronic commutation for changing a direction of a current flowing through coils of an armature and form a continuous rotational magnetic field which rotates the rotor when a position of the rotor and a time point of commutation match.

Sensorless BLDC motor systems, which do not use a Hall sensor as a method of detecting a position of a rotor, mainly use a method of estimating the position of the rotor by detecting a back-electromotive force (BEMF) voltage formed in a three-phase coils when a motor is driven.

Sensorless BLDC motors need to perform a process of estimating an initial position of the rotor before the rotor starts a rotational operation in a stationary state in order to secure operational stability.

However, there is a problem in that it is difficult to estimate the initial position of the rotor because the sensorless BLDC motor system may not detect the BEMF voltage before the sensorless BLDC motor starts a rotational operation.

SUMMARY

The present disclosure is directed to providing a motor driver, a motor drive system, and a method of driving a motor, which may simply estimate an initial position of a rotor.

A motor driver according to one embodiment of the present disclosure may include a gate driver for sequentially driving three-phase coils of a motor in first to sixth operation modes through an inverter for driving the three-phase coils and an initial position detector for detecting a maximum peak value among first to sixth currents by sensing the first to sixth currents flowing through two-phase coils among the three-phase coils through the inverter in each of the first to sixth operation modes, and determine a starting position of a rotor of the motor based on the detected maximum peak value.

A motor drive system according to one embodiment of the present disclosure may include a motor including three-phase coils and a rotor having an N-pair (N is a natural number) pole structure, an inverter for driving the three-phase coils, and a motor driver for sequentially driving the three-phase coils through the inverter in first to sixth operation modes, wherein the motor driver may detect a maximum peak value among first to sixth currents by sensing the first to sixth currents flowing through two-phase coils among the three-phase coils through the inverter in each of the first to sixth operation modes, determine a starting position of the rotor of the motor based on the detected maximum peak value, and start to drive the motor from the determined starting position of the rotor.

A method of driving a motor according to one embodiment of the present disclosure may include sequentially driving three-phase coils of a motor in first to sixth operation modes, detecting first to sixth peak values of each of first to sixth currents flowing through the three-phase coils in each of the first to sixth operation modes, detecting a maximum peak value among the first to sixth peak values, estimating an initial position of a rotor of the motor based on the detected maximum peak value, determining a starting position of the rotor based on the estimated initial position of the rotor, and performing initial driving on the motor from the determined starting position of the rotor.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout the specification. In the following description, when the detailed description of the relevant known function or configuration is determined to unnecessarily obscure the important point of the present disclosure, the detailed description will be omitted. In a case where 'comprise', 'have', and 'include' described in the present specification are used, another part can be added unless 'only' is used. The terms of a singular form can include plural forms unless referred to the contrary.

In construing an element, the element is construed as including an error range although there is no explicit description.

In describing a position relationship, for example, when a position relation between two parts is described as "on," "over," "under," and "next," one or more other parts can be disposed between the two parts unless a more limiting term, such as "just" or "direct(ly)" is used.

In describing a time relationship, for example, when the temporal order is described as, for example, "after," "subsequent," "next," and "before," a case which is not continuous can be included unless a more limiting term, such as "just," "immediate(ly)," or "direct(ly)" is used.

It will be understood that, although the terms "first," "second," etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, the terms "first," "second," "A," "B," "(a)," "(b)," etc., can be used. These terms are intended to identify the corresponding elements from the other elements, and basis, order, or number of the corresponding elements should not be limited by these terms. The expression that an element or a layer is "connected," "coupled," or "adhered" to another element or layer, the element or layer can not only be directly connected or adhered to another element or layer, but also be indirectly connected or adhered to another element or layer with one or more intervening elements or layers "disposed" between the elements or layers, unless otherwise specified.

The term "at least one" should be understood as including any and all combinations of one or more among the associated listed elements. For example, the meaning of "at least one or more of a first element, a second element, and a third element" denotes the combination of all elements proposed from two or more of the first element, the second element, and the third element as well as the first element, the second element, or the third element.

Features of various aspects of the present disclosure can be partially or overall coupled to or combined with each other, and can be variously inter-operated with each other and driven technically as those skilled in the art can sufficiently understand. The aspects of the present disclosure can be carried out independently from each other, or can be carried out together in co-dependent relationship.

Hereinafter, embodiments of the present specification will be described in detail with reference to the accompanying drawings.

Figure 1:
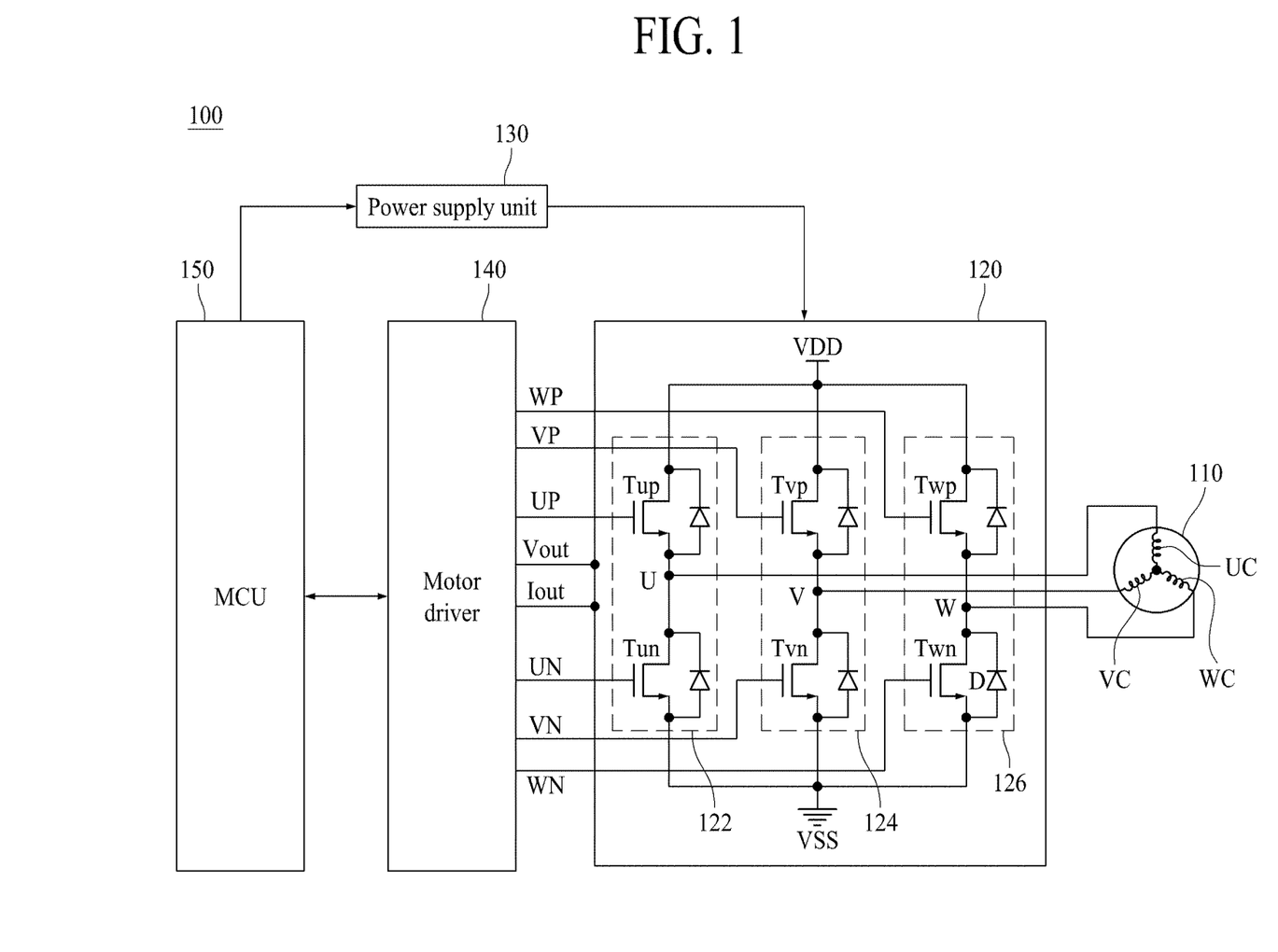
FIG. 1 is a block diagram showing a configuration of a sensorless brushless direct current (BLDC) motor drive system according to one embodiment.
Figure 2:
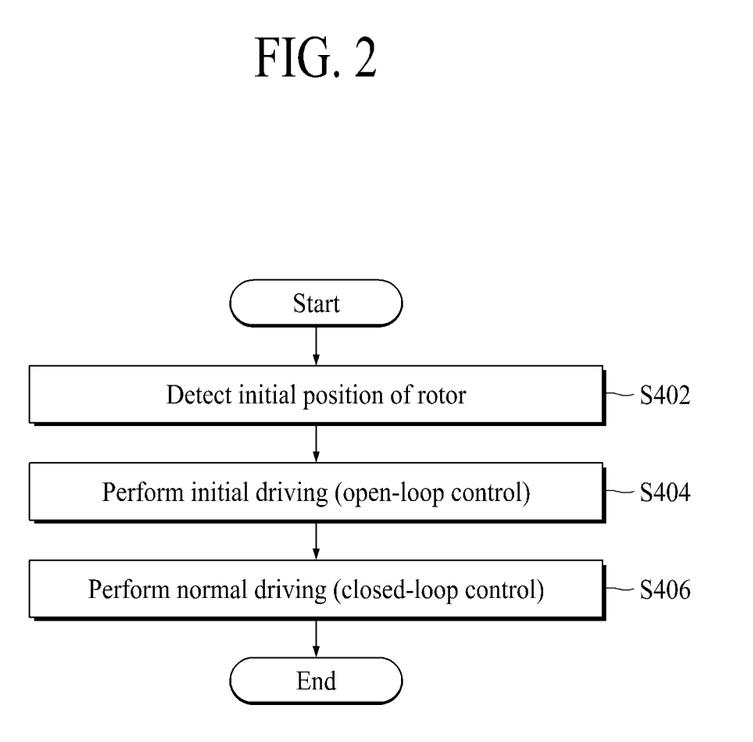
FIG. 2 is a flowchart showing a method of driving a motor according to one embodiment.

FIG. 1 is a block diagram showing a configuration of a brushless direct current (BLDC) motor drive system according to one embodiment of the present disclosure, and FIG. 2 is a flowchart showing a method of driving a motor according to one embodiment.

Referring to FIG. 1, a BLDC motor drive system 100 according to one embodiment may include a BLDC motor 110, an inverter 120, a power supply unit 130, a motor driver 140, and a microcontroller unit (MCU) 150. The inverter 120, the power supply unit 130, the motor driver 140, and the MCU 150 may be integrated into an integrated circuit (IC).

The BLDC motor 110 may include a stator including three-phase coils UC, VC, and WC having different phases and a rotor using a permanent magnet, and the rotor is omitted in FIG. 1. The BLDC motor 110 may be a sensorless BLDC motor not including a Hall sensor.

The stator of the BLDC motor 110 may include a first coil UC having a U-phase (first phase), a second coil VC having a V-phase (second phase), and a third coil WC having a W-phase (third phase).

The BLDC motor 110 may be driven according to a drive signal supplied from the inverter 120 to each of the three-phase coils UC, VC, and WC. The BLDC motor 110 may generate a magnetic force when a current flows to a desired coil among the first to third coils UC, VC, and WC of the stator according to a position of the rotor, and the generated magnetic force may rotate the rotor of the BLDC motor 110. For example, in the BLDC motor 110, a current flows in the first coil UC in a positive (+) direction, no current flows in the second coil VC, and a current flows in the third coil WC in a negative (—) direction according to the drive signal. In this case, in the BLDC motor 110, the first coil UC becomes an N pole and pulls an S pole of the rotor formed of a permanent magnet, and the third coil WC becomes an S pole and pushes the S pole of the rotor, and thus the rotor may be rotated.

The inverter 120 may operate under the control of the motor driver 140 to supply a first power supply voltage VDD or supply a second power supply voltage VSS to each of the three-phase coils UC, VC, and WC of the BLDC motor 110 through each of first to third nodes U, V, and W. The first power supply voltage VDD may be a high potential power supply voltage, and the second power supply voltage VSS may be a low potential power supply voltage.

The inverter 120 may float a specific coil without supplying the first and second power supply voltages VDD and VSS to any one of the three-phase coils UC, VC, and WC under the control of the motor driver 140.

The inverter 120 may receive the first power supply voltage VDD and the second power supply voltage VSS from the power supply unit 130. The inverter 120 may receive 1-1 and 1-2 gate signals UP and UN, 2-1 and 2-2 gate signals VP and VN, and 3-1 and 3-2 gate signals WP and WN from the motor driver 140. The gate signals UP, UN, VP, VN, WP, and WN supplied from the motor driver 140 may be pulse width modulation (PWM) gate signals.

The inverter 120 may include a first switching circuit 122 for driving the first coil UC of the BLDC motor 110, and the first switching circuit 122 may include a first pull-up transistor Tup and a first pull-down transistor Tun connected in series between a supply line of the first power supply voltage VDD and a supply line of the second power supply voltage VSS. The first switching circuit 122 may apply a first drive signal to the first coil UC through a first node U between the first pull-up transistor Tup and the first pull-down transistor Tun.

The first pull-up transistor Tup may be turned on for a period in which the 1-1 gate signal UP is a gate-on voltage and may apply the first power supply voltage VDD to the first coil UC through the first node U. The first pull-down transistor Tun may be turned on for a period in which the 1-2 gate signal UN is the gate-on voltage and may apply the second power supply voltage VSS through the first node U to the first coil UC.

Meanwhile, when both of the 1-1 and 1-2 gate signals UP and UN supplied from the motor driver 140 are gate-off voltages, both of the first pull-up transistor Tup and the first pull-down transistor Tun may be turned off, and thus the first node U and the first coil UC may be in floating states.

The inverter 120 may include a second switching circuit 124 for driving the second coil VC of the BLDC motor 110, and the second switching circuit 124 may include a second pull-up transistor Tvp and a second pull-down transistor Tvn connected in series between the supply line of the first power supply voltage VDD and the supply line of the second power supply voltage VSS. The second switching circuit 124 may apply a second drive signal to the second coil VC through a second node V between the second pull-up transistor Tvp and the second pull-down transistor Tvn.

The second pull-up transistor Tvp may be turned on for a period in which the 2-1 gate signal VP is the gate-on voltage and may apply the first power supply voltage VDD to the second coil VC through the second node V. The second pull-down transistor Tvn may be turned on for a period in which the 2-2 gate signal VN is the gate-on voltage and may apply the second power supply voltage VSS to the second coil VC through the second node V.

Meanwhile, when both of the 2-1 and 2-2 gate signals VP and VN supplied from the motor driver 140 are the gate-off voltages, both of the second pull-up transistor Tvp and the second pull-down transistor Tvn may be turned off, and thus the second node V and the second coil VC may be in the floating states.

The inverter 120 may include a third switching circuit 126 for driving the third coil WC of the BLDC motor 110, and the third switching circuit 126 may include a third pull-up transistor Twp and a third pull-down transistor Twn connected in series between the supply line of the first power supply voltage VDD and the supply line of the second power supply voltage VSS. The third switching circuit 126 may apply a third drive signal to the third coil WC through a third node W between the third pull-up transistor Twp and the third pull-down transistor Twn.

The third pull-up transistor Twp may be turned on for a period in which the 3-1 gate signal WP is the gate-on voltage and may apply the first power supply voltage VDD to the third coil WC through the third node W. The third pull-down transistor Twn may be turned on for a period in which the 3-2 gate signal WN is the gate-on voltage and may apply the second power supply voltage VSS to the third coil WC through the third node W.

Meanwhile, when both of the 3-1 and 3-2 gate signals WP and WN supplied from the motor driver 140 are the gate-off voltages, both of the third pull-up transistor Twp and the third pull-down transistor Twn may be turned off, and thus the third node W and the third coil WC may be in the floating states.

Each of the first to third switching circuits 122, 124, and 126 of the inverter 120 may be referred to as a half bridge circuit. Each of the pull-up transistors Tup, Tvp, and Twp may be referred to as a high-side switching element. Each of the pull-down transistors Tun, Tvn, and Twn may be referred to as a low-side switching element. Each of the pull-up transistors Tup, Tvp, and Twp and each of the pull-down transistors Tun, Tvn, and Twn may include a body diode D.

Each of the PWM gate signals UP, UN, VP, VN, WP, and WN applied from the motor driver 140 to the inverter 120 may have a form in which a PWM duty cycle gradually varies according to a modulation waveform. Therefore, the inverter 120 may output a drive signal in the form of a sine wave to each of the three-phase coils UC, VC, and WC. In each of the three-phase coils UC, VC, and WC, a sine wave-shaped phase voltage, phase current, and back electromotive force voltage (BEMF) may be generated.

The motor driver 140 may control a speed of the motor driver 140 by adjusting the PWM duty cycles of the gate signals UP, UN, VP, VN, WP, and WN. The motor driver 140 may receive a target PWM duty cycle from the MCU 150 and generate a PWM signal whose duty cycle is changed according to the target PWM duty cycle. The motor driver 140 may generate the gate signals UP, UN, VP, VN, WP, and WN using PWM signals according to first to sixth operation modes in which two of the three-phase coils UC, VC, and WC are driven and output the gate signals to the inverter 120.

In order to increase efficiency or drive speed of the BLDC motor 110, the motor driver 140 may control a PWM duty cycle by repeatedly performing lead angle control every drive period in a closed loop control method when driving the BLDC motor 110 through the inverter 120.

The motor driver 140 may detect a zero-crossing point of a phase current and the BEMF voltage by sensing drive signals Vout and Tout of any one specific coil of the three-phase coils UC, VC, and WC from the inverter 120.

The motor driver 140 may detect the zero-crossing point of the phase current by sensing the phase current Tout flowing to at least one specific coil through the inverter 120.

The motor driver 140 may set a floating section of the specific coil based on the detected zero-crossing point. The motor driver 140 may simply detect the BEMF voltage by sensing the phase voltage Vout of the floated coil through the inverter 120 in the set floating section.

The motor driver 140 may perform the lead angle control including at least one of speed control for compensating for an error between a reference voltage and the BEMF voltage by applying proportional-integral (PI) control and phase control for compensating for a phase error between a reference phase and the phase of the phase current by applying the PI control using the detected BEMF voltage and zero-crossing point of the phase current.

The motor driver 140 can increase the motor drive efficiency by controlling the PWM signal to synchronize the phase of the phase current with a phase of the BEMF voltage by performing the lead angle control. The motor driver 140 may quickly increase a motor drive speed to a target speed by controlling the PWM signal so that the phase of the phase current is earlier than the phase of the BEMF voltage by performing the lead angle control.

The MCU 150 may control the drive speed of the BLDC motor 110 by adjusting the PWM duty cycle of the motor driver 140 or adjusting a drive voltage VDD of the power supply unit 130. The MCU 150 may be referred to as a controller.

The MCU 150 may determine the target speed for the BLDC motor 110 and provide the target PWM duty cycle corresponding to the determined target speed to the motor driver 140.

Referring to FIGS. 1 and 2, the BLDC motor drive system 100 according to one embodiment may be driven in the order of an operation of detecting an initial position of the rotor (S402), an operation of performing initial driving using an open loop control method (S404), and an operation of performing normal driving using the closed loop control method (S406).

The motor driver 140 may detect six peak currents and estimate the initial position of the rotor based on an operation mode in which a maximum value of the six peak currents is detected by sensing a current of each operation mode while sequentially driving the three-phase coils UC, VC, and WC in six operation modes before the rotor starts the rotational operation in the BLDC motor 110 (S402). The motor driver 140 may estimate an area in which an N pole of the rotor is positioned by detecting the operation mode having the maximum peak current by a minimum inductance among the six operation modes. A detailed description thereof will be given below.

The motor driver 140 may start the rotational operation from the estimated initial position of the rotor and drive the BLDC motor 110 through the inverter 120 while increasing the PWM duty cycle by the open loop control method without feedback from the inverter 120 to quickly reach the target speed (S404).

When the performing of the initial driving (S404) is finished, the motor driver 140 may receive feedback from the inverter 120 and drive the BLDC motor 110 at the target speed through the inverter 120 by the closed loop control method (S406).

Figure 3:
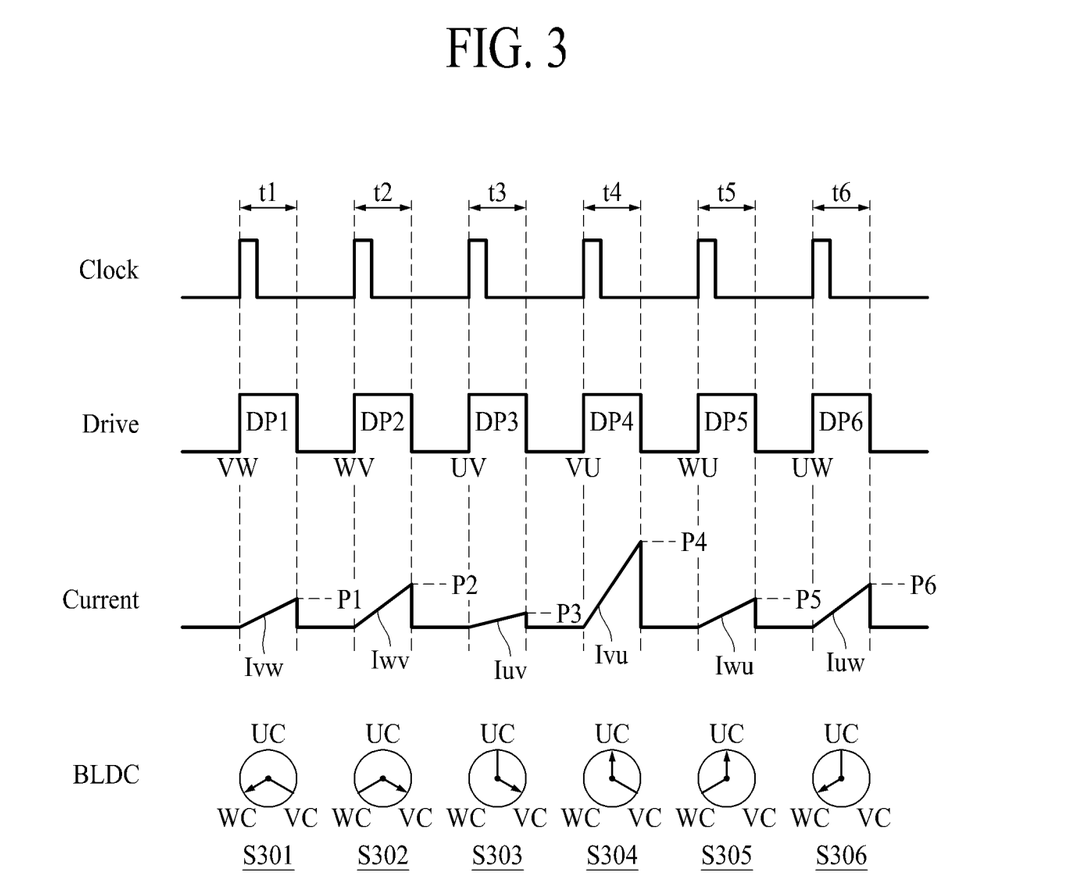
FIG. 3 is a waveform diagram showing signals, which are related to an operation of detecting an initial position of a rotor, of a motor driver according to one embodiment.
Figure 4:
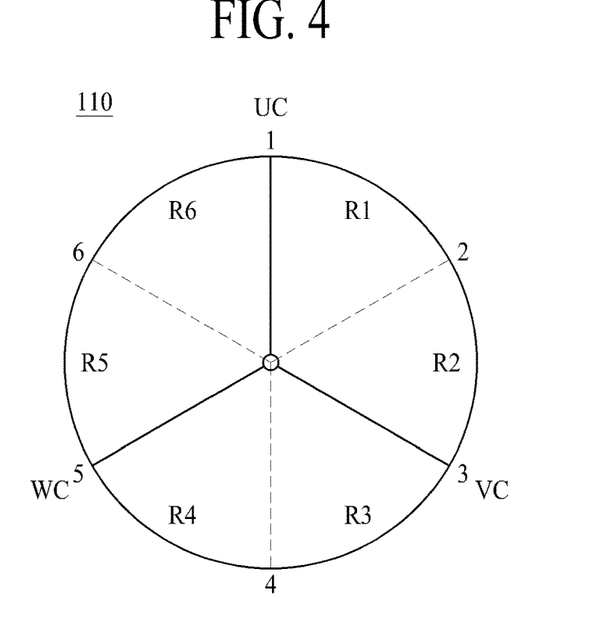
FIG. 4 is a view showing positional areas of a one-pair pole-type rotor divided based on a three-phase coils according to one embodiment.
Figure 5:
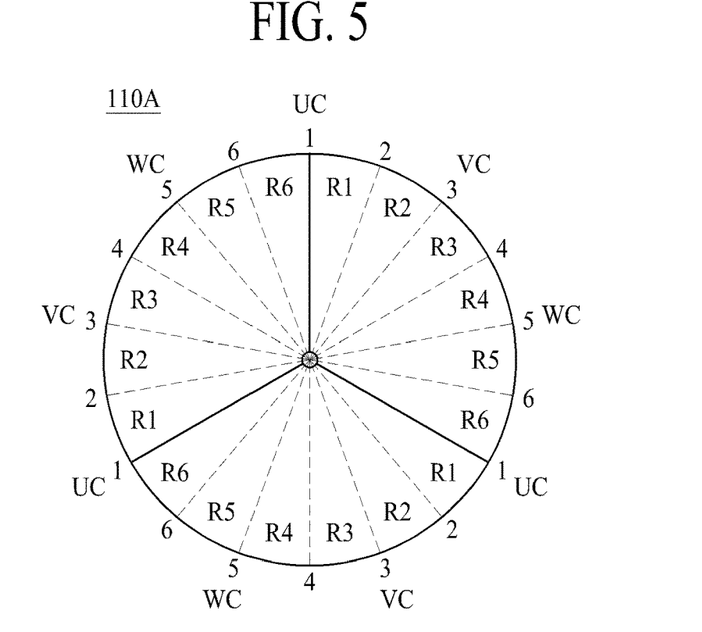
FIG. 5 is a view showing positional areas of a three-pair pole-type rotor divided based on the three-phase coils according to one embodiment.

FIG. 3 is a waveform diagram showing signals, which are related to an operation of detecting an initial position of a rotor, of a motor driver according to one embodiment, FIG. 4 is a view showing positional areas of a one-pair pole-type rotor divided based on a three-phase coils according to one embodiment, and FIG. 5 is a view showing positional areas of a three-pair pole-type rotor divided based on the three-phase coils according to one embodiment.

Referring to FIGS. 1 and 3, the motor driver 140 may sequentially drive the BLDC motor 110 in first to sixth operation modes S301 to S306 through the inverter 120 using first to sixth drive pulses DP1 to DP6 in synchronization with a clock signal and sense a current of each of the three-phase coils UC, VC, and WC in each operation mode through the inverter 120. The first to sixth drive pulses DP1 to DP6 may be set to have the same pulse width and stored in an internal register in advance. For example, according to the present invention, the same pulse width is 280 ms (+/−100 ms). If the pulse width is too long, a current on the motor is large and power loss is concerned. The time required for signal processing without power loss is about 280 ms.

In the first operation mode S301 of a first period t1, the motor driver 140 may supply the first drive pulse DP1 to the pull-up transistor Tvp of the second switching circuit 124 and the pull-down transistor Twn of the third switching circuit 126 in order to drive the V-phase and W-phase coils VC and WC. Therefore, since the high potential power supply voltage VDD is applied to the V-phase coil VC of the BLDC motor 110 and the low potential power supply voltage VSS is applied to the W-phase coil WC of the BLDC motor 110, a first current Ivw flowing from the V-phase coil VC toward the W-phase coil WC may be generated in a gradually increasing form.

In the second operation mode S302 of a second period t2, the motor driver 140 may supply the second drive pulse DP2 to the pull-up transistor Twp of the third switching circuit 126 and the pull-down transistor Tvn of the second switching circuit 124 in order to drive the W-phase and V-phase coils WC and VC. Therefore, since the high potential power supply voltage VDD is applied to the W-phase coil WC of the BLDC motor 110 and the low potential power supply voltage VSS is applied to the V-phase coil VC of the BLDC motor 110, a second current Iwv flowing from the W-phase coil WC toward the V-phase coil VC may be generated in a gradually increasing form.

In the third operation mode S303 of a third period t3, the motor driver 140 may supply the third drive pulse DP3 to the pull-up transistor Tup of the first switching circuit 122 and the pull-down transistor Tvn of the second switching circuit 124 in order to drive the U-phase and V-phase coils UC and VC. Therefore, since the high potential power supply voltage VDD is applied to the U-phase coil UC of the BLDC motor 110 and the low-potential power supply voltage VSS is applied to the V-phase coil VC of the BLDC motor 110, a third current Iuv flowing from the U-phase coil UC toward the V-phase coil VC may be generated in a gradually increasing form.

In the fourth operation mode S304 of a fourth period t4, the motor driver 140 may supply the fourth drive pulse DP4 to the pull-up transistor Tvp of the second switching circuit 124 and the pull-down transistor Tun of the first switching circuit 122 in order to drive the V-phase and U-phase coils VC and UC. Therefore, since the high potential power supply voltage VDD is applied to the V-phase coil VC of the BLDC motor 110 and the low-potential power supply voltage VSS is applied to the U-phase coil UC of the BLDC motor 110, a fourth current Ivu flowing from the V-phase coil VC toward the U-phase coil UC may be generated in a gradually increasing form.

In the fifth operation mode S305 of a fifth period t5, the motor driver 140 may supply the fifth drive pulse DP5 to the pull-up transistor Twp of the third switching circuit 126 and the pull-down transistor Tun of the first switching circuit 122 in order to drive the W-phase and U-phase coils WC and UC. Therefore, since the high potential power supply voltage VDD is applied to the W-phase coil WC of the BLDC motor 110 and the low-potential power supply voltage VSS is applied to the U-phase coil UC of the BLDC motor 110, a fifth current Iwu flowing from the W-phase coil WC toward the U-phase coil UC may be generated in a gradually increasing form.

In the sixth operation mode S306 of a sixth period t6, the motor driver 140 may supply the sixth drive pulse DP6 to the pull-up transistor Tup of the first switching circuit 122 and the pull-down transistor Twn of the third switching circuit 126 in order to drive the U-phase and W-phase coils UC and WC. Therefore, since the high potential power supply voltage VDD is applied to the U-phase coil UC of the BLDC motor 110 and the low-potential power supply voltage VSS is applied to the W-phase coil WC of the BLDC motor 110, a sixth current Iuw flowing from the U-phase coil UC toward the W-phase coil WC may be generated in a gradually increasing form.

The motor driver 140 may detect first to sixth peak values P1 to P6 by sensing the first to sixth currents Ivw, Iwv, Iuv, Ivu, Iwu, and Iuw through the inverter 120 in each of the first to sixth operation modes S301 to S306. The motor driver 140 may detect a maximum peak value among the first to sixth peak values P1 to P6 and estimate the position of the rotor, that is, the N pole position of the rotor based on an operation mode in which the maximum peak current is detected using a minimum inductance.

Referring to FIG. 4, the BLDC motor 110 according to one embodiment may include a stator having a three-phase and three-slot structure in which the three-phase coils UC, VC, and WC are sequentially disposed in three slots at intervals of 120 degrees and a rotor having a one-pair pole structure formed of a permanent magnet having a pair of an N pole and an S pole. In the three-slot and one-pair pole-type BLDC motor 110 shown in FIG. 4, an initial position of the rotor may be estimated as any one of first to sixth areas R1 to R6 each having a rotational angle of 60 degrees.

Referring to FIG. 5, a BLDC motor 110A according to one embodiment may include a stator having a three-phase and nine-slot structure in which the three-phase coils UC, VC, and WC are sequentially repeatedly disposed in nine slots at intervals of 40 degrees and a rotor having a three-pair pole structure formed of a permanent magnet having three pairs of an N pole and an S pole. In the nine-slot and three-pair pole-type BLDC motor 110A shown in FIG. 5, an initial position of the rotor may be estimated as any one of first to sixth areas R1 to R6 each having a rotational angle of 20 degrees, and it can be seen that the first to sixth areas R1 to R6 are equally repeated in each of three sets repeated at every 120 degrees.

In addition, a three-phase BLDC motor according to one embodiment may have a structure in which the number of coils (slots) and the number of permanent magnets are variously configured, such as a three-slot and two-pair pole type including a stator having a three-slot structure and a rotor having a two-pair pole structure, a six-slot and two-pair pole type including a stator having a six slot structure and a rotor having a two-pair pole structure, or a twelve-slot and eight-pair pole type having a stator having a twelve-slot structure and a rotor having an eight-pair pole structure. Even when the three-phase BLDC motor has various structures, there may be provided first to sixth areas R1 to R6 of each of N (N is a natural number) sets capable of estimating the initial position of the rotor according to the number of pole-pairs of the rotor.

The motor driver 140 may estimate the area of the initial position of the rotor as shown in Table 1 below depending on a case in which any one of the first to sixth peak values P1 to P6 of each of the first to sixth currents Ivw, Iwv, Iuv, Ivu, Iwu, and Iuw detected in each of the first to sixth operation modes S301 to S306 has a maximum value.

TABLE 1

| Area | Iwu | Iwv | Iuv | Iuw | Ivw | Ivu |
|---|---|---|---|---|---|---|
| R1 | 1 | * | * | * | * | * |
| R2 | * | 1 | * | * | * | * |
| R3 | * | * | 1 | * | * | * |
| R4 | * | * | * | 1 | * | * |
| R5 | * | * | * | * | 1 | * |
| R6 | * | * | * | * | * | 1 |

Referring to Table 1 and FIGS. 1 and 3 to 6, the motor driver 140 may estimate the initial position of the rotor as the fifth area R5 when the first peak value P1 of the first current Ivw flowing from the V-phase coil VC toward the W-phase coil WC detected in the first operation mode (S301) is detected as the maximum value.

The motor driver 140 may estimate the initial position of the rotor as the second area R2 when the second peak value P2 of the second current Iwv flowing from the W-phase coil WC toward the V-phase coil VC detected in the second operation mode (S302) is detected as the maximum value.

The motor driver 140 may estimate the initial position of the rotor as the third area R3 when the third peak value P3 of the third current Iuv flowing from the U-phase coil UC toward the V-phase coil VC detected in the third operation mode (S303) is detected as the maximum value.

The motor driver 140 may estimate the initial position of the rotor as the sixth area R6 when the fourth peak value P4 of the fourth current Ivu flowing from the V-phase coil VC toward the U-phase coil UC detected in the fourth operation mode (S304) is detected as the maximum value.

The motor driver 140 may estimate the initial position of the rotor as the first area R1 when the fifth peak value P5 of the fifth current Iwu flowing from the W-phase coil WC toward the U-phase coil UC detected in the fifth operation mode (S305) is detected as the maximum value.

The motor driver 140 may estimate the initial position of the rotor as the fourth area R4 when the sixth peak value P6 of the sixth current Iuw flowing from the U-phase coil UC toward the W-phase coil WC detected in the sixth operation mode (S306) is detected as the maximum value.

When the initial position of the rotor among the first to sixth areas R1 to R6 is estimated, the motor driver 140 may determine a starting position of the rotor based on the estimated initial position of the rotor in a next open loop control operation according to a rotational direction determined by a user.

When the rotational direction of the motor 110 is clockwise CW, the motor driver 140 according to one embodiment may determine the starting position of the rotor as an area R(x+1) which is a next area of an estimated area Rx among the first to sixth areas R1 to R6 and drive the BLDC motor 110 through the inverter 120 so that the BLDC motor 110 starts to rotate from the area R(x+1) which is the determined starting position of the rotor.

Additionally, the motor driver 140 according to one embodiment may drive the BLDC motor 110 through the inverter 120 so that the BLDC motor 110 starts to rotate from a position (R(x+1)+advance angle) obtained by adding a preset advance angle to the area R(x+1) which is the determined starting position of the rotor among the first to sixth areas R1 to R6. The advance angle refers to an offset value preset by a designer. For example, according to the present invention, the advance angle ranges between 0 degree and 30 degree.

When the rotational direction of the motor 110 is counterclockwise CCW, the motor driver 140 according to one embodiment may determine the starting position of the rotor as the estimated area Rx among the first to sixth areas R1 to R6 and drive the BLDC motor 110 through the inverter 120 so that the BLDC motor 110 starts to rotate from the area Rx which is the determined starting position of the rotor.

Additionally, the motor driver 140 according to one embodiment may drive the BLDC motor 110 through the inverter 120 so that the BLDC motor 110 starts to rotate from a position (Rx+advance angle) obtained by adding the preset advance angle to the area Rx which is the determined starting position of the rotor among the first to sixth areas R1 to R6.

Figure 6:
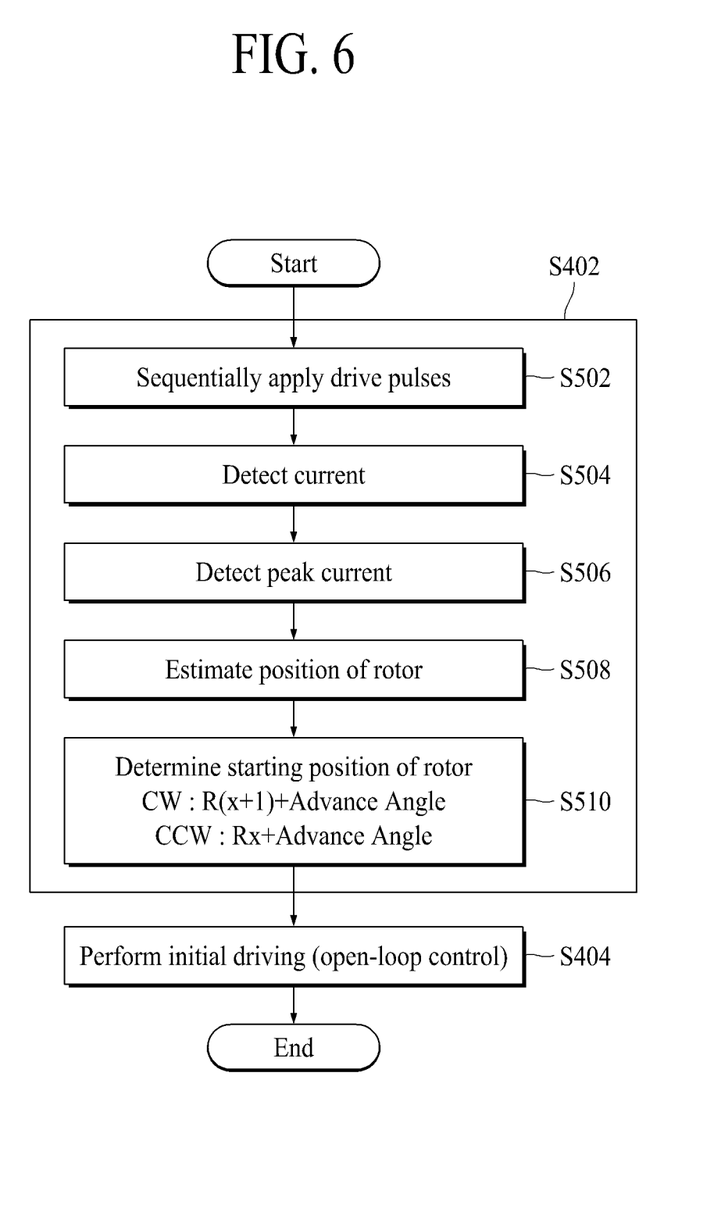
FIG. 6 is a flowchart showing a method of detecting an initial position of a rotor in the method of driving a motor according to one embodiment.

FIG. 6 is a flowchart showing a method of detecting an initial position of a rotor in the method of driving a motor according to one embodiment. The method of detecting an initial position of a rotor shown in FIG. 6 specifically shows the detecting of the initial position of the rotor (S402) shown in FIG. 2.

Referring to FIGS. 1 to 6, the motor driver 140 may sequentially drive the BLDC motor 110 in the first to sixth operation modes (S301 to S306) through the inverter 120 using the first to sixth drive pulses DP1 to DP6 (S502) and detect each of the first to sixth peak values P1 to P6 of each of the first to sixth currents Ivw, Iwv, Iuv, Ivu, Iwu, and Iuw flowing to the three-phase coils UC, VC, and WC in each operation mode through the inverter 120 (S504).

The motor driver 140 may detect the maximum peak value among the first to sixth peak values P1 to P6 (S506).

The motor driver 140 may estimate the initial position area of the rotor based on the operation mode in which the maximum peak value is detected (S508).

For example, when the first peak value P1 of the first current Ivw detected in the first operation mode (S301) is the maximum value, the motor driver 140 may estimate the initial position of the rotor as the fifth area R5. When the second peak value P2 of the second current Iwv detected in the second operation mode (S302) is the maximum value, the motor driver 140 may estimate the initial position of the rotor as the second area R2. When the third peak value P3 of the third current Iuv detected in the third operation mode (S303) is the maximum value, the motor driver 140 may estimate the initial position of the rotor as the third area R3. When the fourth peak value P4 of the fourth current Ivu detected in the fourth operation mode (S304) is the maximum value, the motor driver 140 may estimate the initial position of the rotor as the sixth area R6. When the fifth peak value P5 of the fifth current Iwu detected in the fifth operation mode (S305) is the maximum value, the motor driver 140 may estimate the initial position of the rotor as the first area R1. When the sixth peak value P6 of the sixth current Iuw detected in the sixth operation mode S306 is the maximum value, the motor driver 140 may estimate the initial position of the rotor as the fourth area R4.

When the initial position of the rotor is estimated among the first to sixth areas R1 to R6, the motor driver 140 may determine the starting position of the rotor based on the estimated initial position of the rotor according to the rotational direction determined by the user (S510).

For example, when the rotational direction of the motor 110 is clockwise CW(a forward direction), the motor driver 140 may determine the area R(x+1) which is the next area of the estimated area Rx among the first to sixth areas R1 to R6 as the starting position of the rotor or determine the position (R(x+1)+advance angle) obtained by adding the preset advance angle to the area R(x+1) as the starting position of the rotor.

When the rotational direction of the motor 110 is counterclockwise CCW(a backward direction), the motor driver 140 may determine the estimated area Rx among the first to sixth areas R1 to R6 as the starting position of the rotor or determine the position (Rx+advance angle) obtained by adding the preset advance angle to the estimated area Rx as the starting position of the rotor.

The motor driver 140 may drive the BLDC motor 110 through the inverter 120 so that the BLDC motor 110 starts to rotate from the starting position of the rotor determined in the detecting of the initial position of the rotor (S402) in the performing of the initial driving (S404).

Figure 7:
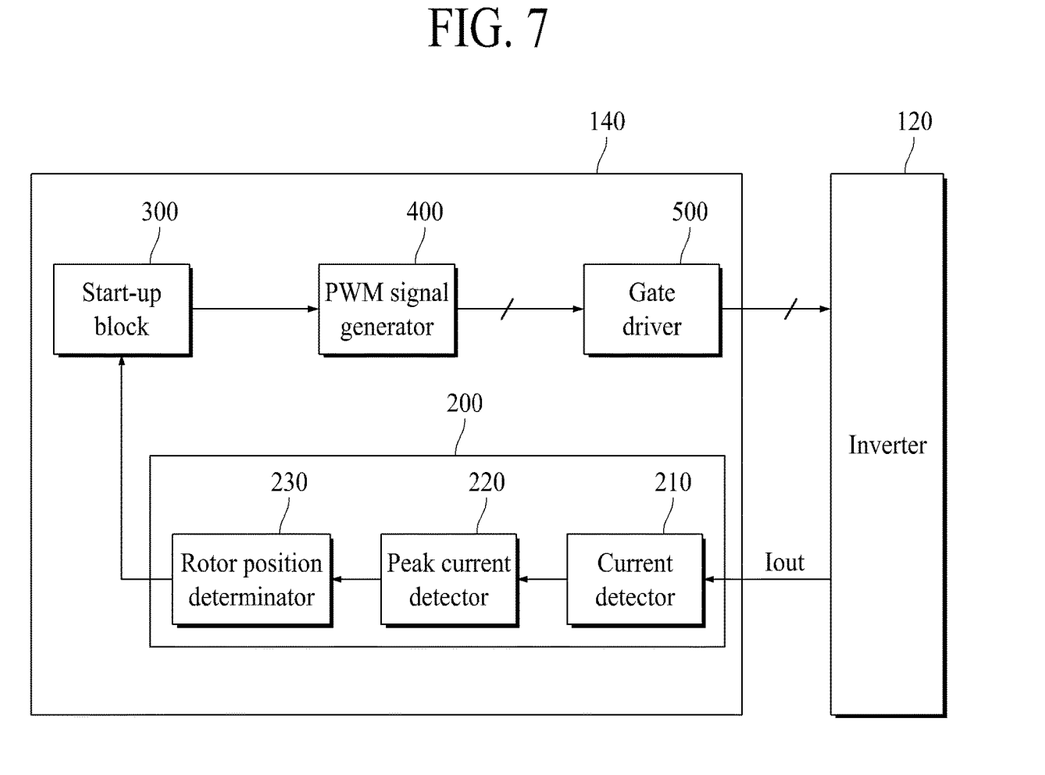
FIG. 7 is a block diagram mainly showing components, which are related to the operation of detecting an initial position of a rotor, of the motor driver according to one embodiment.

FIG. 7 is a block diagram mainly showing components, which are related to an initial position detection mode of the rotor, of the motor driver according to one embodiment.

Referring to FIG. 7, the motor driver 140 according to one embodiment may at least include an initial position detector 200, a start-up block 300, a PWM signal generator 400, and a gate driver 500, which operate in the initial position detecting mode of the rotor.

The start-up block 300 may output an initial position detection mode signal indicating the initial position detection mode to the PWM signal generator 400.

The PWM signal generator 400 may generate the first to sixth drive pulses DP1 to DP6 having a constant pulse width in response to the initial position detection mode signal and output the generated first to sixth drive pulses DP1 to DP6 to the gate driver 500.

The gate driver 500 may output the first to sixth drive pulses DP1 to DP6 to the corresponding switching circuits of the inverter 120 according to the order of the first to sixth operation modes (S301 to S306), and thus the inverter 120 may sequentially drive the BLDC motor 110 in the first to sixth operation modes (S301 to S306) as shown in FIG. 3.

The initial position detector 200 may detect the maximum peak value by sensing each of the first to sixth currents Ivw, Iwv, Iuv, Ivu, Iwu, and Iuw flowing to the three-phase coils UC, VC, and WC in each of the first to sixth operation modes (S301 to S306) and estimate the initial area of the rotor.

To this end, the initial position detector 200 may include a current detector 210, a peak current detector 220, and a rotor position determinator 230.

The current detector 210 may sense each of the first to sixth peak values P1 to P6 of each of the first to sixth currents Ivw, Iwv, Iuv, Ivu, Iwu, and Iuw flowing to the three-phase coils UC, VC, and WC in each of the first to sixth operation modes (S301 to S306) and digitizes the sensed values through an analog-to-digital converter (ADC) to output the digitized values.

The peak current detector 220 may detect and output the maximum peak value among the first to sixth peak values P1 to P6.

The rotor position determinator 230 may estimate the initial position area of the rotor based on the operation mode in which the maximum peak value is detected and determine the starting position of the rotor according to the rotational direction determined by the user based on the estimated initial position of the rotor.

For example, the rotor position determinator 230 may estimate the initial position of the rotor as the fifth area R5 when the first peak value P1 of the first current Ivw is the maximum value. The rotor position determinator 230 may estimate the initial position of the rotor as the second area R2 when the second peak value P2 of the second current Iwv is the maximum value. The rotor position determinator 230 may estimate the initial position of the rotor as the third area R3 when the third peak value P3 of the third current Iuv is the maximum value. The rotor position determinator 230 may estimate the initial position of the rotor as the sixth area R6 when the fourth peak value P4 of the fourth current Ivu is the maximum value. The rotor position determinator 230 may estimate the initial position of the rotor as the first area R1 when the fifth peak value P5 of the fifth current Iwu is the maximum value. The rotor position determinator 230 may estimate the initial position of the rotor as the fourth area R4 when the sixth peak value P6 of the sixth current Iuw is the maximum value.

The rotor position determinator 230 may determine the starting position of the rotor according to the rotational direction determined by the user based on the estimated initial position of the rotor among the first to sixth areas R1 to R6.

For example, when the rotational direction of the motor 110 is clockwise CW(a forward direction), the rotor position determinator 230 may determine the area R(x+1) which is the next area of the estimated area Rx among the first to sixth areas R1 to R6 as the starting position of the rotor or determine the position (R(x+1)+advance angle) obtained by adding the preset advance angle to the area R(x+1) as the starting position of the rotor.

When the rotational direction of the motor 110 is counterclockwise CCW(a backward direction), the rotor position determinator 230 may determine the estimated area Rx among the first to sixth areas R1 to R6 as the starting position of the rotor or determine the position (Rx+advance angle) obtained by adding the preset advance angle to the estimated area Rx as the starting position of the rotor.

The start-up block 300 may control the PWM signal generator 400 so that the BLDC motor 110 starts to rotate from the starting position of the rotor determined in the rotor initial position detection mode, and thus the BLDC motor 110 may start to rotate from the initial position of the rotor through the gate driver 500 and the inverter 120.

As described above, the motor driver and method of driving a motor according to one embodiment of the present disclosure can secure operational stability and also reduce the number of circuit components and power consumption by simply estimating the initial position of the rotor based on the operation mode in which the maximum peak current is detected using the minimum inductance by sequentially driving the three-phase coils in the six operation modes before the rotor performs the rotational operation.

Those skilled in the art to which the present disclosure pertains will be able to understand that the above-described present disclosure may be carried out in other specific forms without changing the technical spirit or essential features thereof.

Therefore, it should be understood that the embodiments described above are illustrative and not restrictive in all respects. The scope of the present disclosure is described by the appended claims rather than the detailed description, and all changes or modifications derived from the meaning and scope of the claims and their equivalent concepts should be construed as being included in the scope of the present disclosure.

What is claimed is:

1. A motor driver comprising:
a gate driver configured to sequentially drive three-phase coils of a motor in first to sixth operation modes through an inverter configured to drive the three-phase coils; and
an initial position detector configured to detect a maximum peak value among first to sixth currents by sensing the first to sixth currents flowing through two-phase coils among the three-phase coils through the inverter in each of the first to sixth operation modes, and determine a starting position of a rotor of the motor based on the detected maximum peak value.

2. The motor driver of claim 1, further comprising a pulse width modulation (PWM) signal generator configured to sequentially generate first to sixth drive pulses having a constant pulse width,
wherein the gate driver is configured to output the first to sixth drive pulses to the inverter according to an order of the first to sixth operation modes.

3. The motor driver of claim 1, wherein a rotational angle area of the motor includes N sets of first to sixth areas when the rotor has an N-pair (N is a natural number) pole structure, and
the initial position detector is configured to:
estimate an initial position of the rotor as any one of the first to sixth areas in each of the N sets based on an operation mode in which the maximum peak value among the first to sixth currents has been detected; and
determine the starting position of the rotor based on the estimated initial position of the rotor and a rotational direction of the motor.

4. The motor driver of claim 3, wherein, when the rotational direction of the motor is clockwise, the initial position detector is configured to:
determine a next area of an area estimated as the initial position of the rotor among the first to sixth areas as the starting position of the rotor; or
determine a position obtained by adding a preset advance angle to the next area as the starting position of the rotor.

5. The motor driver of claim 3, wherein, when the rotational direction of the motor is counterclockwise, the initial position detector is configured to:
determine an area estimated as the initial position of the rotor among the first to sixth areas as the starting position of the rotor; or
determine a position obtained by adding a preset advance angle to the estimated area as the starting position of the rotor.

6. The motor driver of claim 3, wherein the three-phase coils are driven by the inverter in the first operation mode, and
the initial position detector is configured to:
detect a first peak value by sensing the first current flowing from a V-phase coil toward a W-phase coil among the three-phase coils through the inverter; and
estimate the fifth area as the initial position of the rotor when the first peak value is determined as the maximum peak value.

7. The motor driver of claim 3, wherein the three-phase coils are driven by the inverter in the second operation mode, and
the initial position detector is configured to:
detect a second peak value by sensing the second current flowing from a W-phase coil toward a V-phase coil among the three-phase coils through the inverter; and
estimate the second area as the initial position of the rotor when the second peak value is determined as the maximum peak value.

8. The motor driver of claim 3, wherein the three-phase coils are driven by the inverter in the third operation mode, and
the initial position detector is configured to:
detect a third peak value by sensing the third current flowing from a U-phase coil toward a V-phase coil among the three-phase coils through the inverter; and
estimate the third area as the initial position of the rotor when the third peak value is determined as the maximum peak value.

9. The motor driver of claim 3, wherein the three-phase coils are driven by the inverter in the fourth operation mode, and
the initial position detector is configured to:
detect a fourth peak value by sensing the fourth current flowing from a V-phase coil toward a U-phase coil among the three-phase coils through the inverter; and
estimate the sixth area as the initial position of the rotor when the fourth peak value is determined as the maximum peak value.

10. The motor driver of claim 3, wherein the three-phase coils are driven by the inverter in the fifth operation mode, and
the initial position detector is configured to:
detect a fifth peak value by sensing the fifth current flowing from a W-phase coil toward a U-phase coil among the three-phase coils through the inverter; and estimate the first area as the initial position of the rotor when the fifth peak value is determined as the maximum peak value.

11. The motor driver of claim 3, wherein the three-phase coils are driven by the inverter in the sixth operation mode, and
the initial position detector is configured to:
detect a sixth peak value by sensing the sixth current flowing from a U-phase coil toward a W-phase coil among the three-phase coils through the inverter; and
estimate the fourth area as the initial position of the rotor when the sixth peak value is determined as the maximum peak value.

12. A motor drive system comprising:
a motor including three-phase coils and a rotor having an N-pair (N is a natural number) pole structure;
an inverter configured to drive the three-phase coils; and
a motor driver configured to sequentially drive the three-phase coils through the inverter in first to sixth operation modes,
wherein the motor driver is configured to:
detect a maximum peak value among first to sixth currents by sensing the first to sixth currents flowing through two-phase coils among the three-phase coils through the inverter in each of the first to sixth operation modes;
determine a starting position of the rotor of the motor based on the detected maximum peak value; and
start to drive the motor from the determined starting position of the rotor.

13. The motor drive system of claim 12, wherein a rotational angle area of the motor includes N sets of first to sixth areas corresponding to the N-pair pole structure of the rotor, and the motor driver is configured to:
sequentially generate first to sixth drive pulses having a constant pulse width;
output the first to sixth drive pulses to the inverter according to an order of the first and sixth operation modes;
estimate an initial position of the rotor as any one of the first to sixth areas in each of the N sets based on an operation mode in which the maximum peak value among the first to sixth currents has been detected; and
determine the starting position of the rotor based on the estimated initial position of the rotor and a rotational direction of the motor.

14. The motor drive system of claim 13, wherein, when the rotational direction of the motor is clockwise, the motor driver is configured to:
determine a next area of the first to sixth areas as the starting position of the rotor; or
determine a position obtained by adding a preset advance angle to the next area as the starting position of the rotor.

15. The motor drive system of claim 13, wherein, when the rotational direction of the motor is counterclockwise, the motor driver is configured to:
determine an area estimated as the initial position of the rotor among the first to sixth areas as the starting position of the rotor; or
determine a position obtained by adding a preset advance angle to the estimated area as the starting position of the rotor.

16. The motor drive system of claim 13, wherein the motor driver is configured to:
estimate the fifth area as the initial position of the rotor when a first peak value of the first current flowing from a V-phase coil toward a W-phase coil among the three-phase coils sensed in the first operation mode is determined as the maximum peak value;
estimate the second area as the initial position of the rotor when a second peak value of the second current flowing from a W-phase coil toward a V-phase coil among the three-phase coils sensed in the second operation mode is determined as the maximum peak value;
estimate the third area as the initial position of the rotor when a third peak value of the third current flowing from a U-phase coil toward a V-phase coil among the three-phase coils sensed in the third operation mode is determined as the maximum peak value;
estimate the sixth area as the initial position of the rotor when a fourth peak value of the fourth current flowing from a V-phase coil toward a U-phase coil among the three-phase coils sensed in the fourth operation mode is determined as the maximum peak value;
estimate the first area as the initial position of the rotor when a fifth peak value of the fifth current flowing from a W-phase coil toward a U-phase coil among the three-phase coils sensed in the fifth operation mode is determined as the maximum peak value; and
estimate the fourth area as the initial position of the rotor when a sixth peak value of the sixth current flowing from a U-phase coil toward a W-phase coil among the three-phase coils sensed in the sixth operation mode is determined as the maximum peak value.

17. A method of driving a motor, comprising:
sequentially driving three-phase coils of a motor in first to sixth operation modes;
detecting first to sixth peak values of each of first to sixth currents flowing through the three-phase coils in each of the first to sixth operation modes;
detecting a maximum peak value among the first to sixth peak values;
estimating an initial position of a rotor of the motor based on the detected maximum peak value;
determining a starting position of the rotor based on the estimated initial position of the rotor; and
initially driving the motor from the determined starting position of the rotor.

18. The method of claim 17, wherein a rotational angle area of the motor includes N sets of first to sixth areas corresponding to the N-pair pole structure of the rotor,
the sequentially driving of the three-phase coils of the motor in the first to sixth operation modes includes sequentially generating first to sixth drive pulses having a constant pulse width, and driving, by an inverter, two-phase coils among the three-phase coils in the first to sixth operation modes by outputting the first to sixth drive pulses to the inverter according to an order of the first to sixth operation modes, and
the estimating of the initial position of the rotor includes estimating the initial position of the rotor as any one of the first to sixth areas in each of the N sets based on an operation mode in which a maximum peak value among the first to sixth currents has been detected.

19. The method of claim 17, wherein the determining of the starting position of the rotor includes:
determining a next area of first to sixth areas as the starting position of the rotor, or determining a position obtained by adding a preset advance angle to the next area as the starting position of the rotor when a rotational direction of the motor is clockwise; and
determining an area estimated as the initial position of the rotor among the first to sixth areas as the starting position of the rotor, or determining a position obtained by adding a preset advance angle to the estimated area as the starting position of the rotor when the rotational direction of the motor is counterclockwise.

20. The method of claim 17, wherein the estimating of the initial position of the rotor includes:
- estimating a fifth area as the initial position of the rotor when the first peak value of the first current flowing from a V-phase coil toward a W-phase coil among the three-phase coils sensed in the first operation mode is determined as the maximum peak value;
- estimating a second area as the initial position of the rotor when the second peak value of the second current flowing from a W-phase coil toward a V-phase coil among the three-phase coils sensed in the second operation mode is determined as the maximum peak value;
- estimating a third area as the initial position of the rotor when the third peak value of the third current flowing from a U-phase coil toward a V-phase coil among the three-phase coils sensed in the third operation mode is determined as the maximum peak value;
- estimating a sixth area as the initial position of the rotor when the fourth peak value of the fourth current flowing from a V-phase coil toward a U-phase coil among the three-phase coils sensed in the fourth operation mode is determined as the maximum peak value;
- estimating a first area as the initial position of the rotor when the fifth peak value of the fifth current flowing from a W-phase coil toward a U-phase coil among the three-phase coils sensed in the fifth operation mode is determined as the maximum peak value; and/or
- estimating a fourth area as the initial position of the rotor when the sixth peak value of the sixth current flowing from a U-phase coil toward a W-phase coil among the three-phase coils sensed in the sixth operation mode is determined as the maximum peak value.

\* \* \* \* \*